United States Patent
Saillet et al.

(10) Patent No.: US 11,748,382 B2
(45) Date of Patent: Sep. 5, 2023

(54) DATA CLASSIFICATION

(71) Applicant: International Business Machines Corporation, Armonk, NY (US)

(72) Inventors: Yannick Saillet, Stuttgart (DE); Namit Kabra, Hyderabad (IN); Mike W. Grasselt, Leinfelden-Echterdingen (DE); Krishna Kishore Bonagiri, Ambajipet (IN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 16/876,660

(22) Filed: May 18, 2020

(65) Prior Publication Data

US 2021/0026872 A1    Jan. 28, 2021

(30) Foreign Application Priority Data

Jul. 25, 2019 (EP) .................................. 19188266

(51) Int. Cl.
  *G06F 16/28* (2019.01)
  *G06F 16/2457* (2019.01)
  *G06F 16/22* (2019.01)
  *G06N 20/00* (2019.01)
  *G06F 16/248* (2019.01)
  *G06F 18/214* (2023.01)
  *G06N 7/01* (2023.01)

(52) U.S. Cl.
  CPC .......... *G06F 16/285* (2019.01); *G06F 16/221* (2019.01); *G06F 16/248* (2019.01); *G06F 16/24573* (2019.01); *G06F 18/214* (2023.01); *G06N 7/01* (2023.01); *G06N 20/00* (2019.01)

(58) Field of Classification Search
  None
  See application file for complete search history.

(56) References Cited

U.S. PATENT DOCUMENTS

| | | | |
|---|---|---|---|
| 8,577,902 B1 * | 11/2013 | Ye ....................... | H03M 7/3077 707/693 |
| 9,165,051 B2 | 10/2015 | Masud et al. | |
| 9,324,022 B2 | 4/2016 | Williams, Jr. et al. | |
| 10,055,430 B2 | 8/2018 | Oberhofer et al. | |

(Continued)

OTHER PUBLICATIONS

Saillet et al., "Data Classification," Application No. EP19188266.1, Filed Jul. 25, 2019.

*Primary Examiner* — Yu Zhao
(74) *Attorney, Agent, or Firm* — Grant Johnson

(57) ABSTRACT

A method provides for classifying data fields of a dataset. A classifier configured for determining confidence values for a plurality of data classes for the data fields may be applied. Using the confidence values, data class candidates may be identified. Data fields may be determined for which a plurality of data class candidates is identifiable. Using previous user-selected data class assignments, a probability may be determined for the data class candidates that the respective data class candidate is a data class to which the respective data field is to be assigned. The data fields may be classified using the probabilities to select for the data fields a data class from the data class candidates. The dataset may be provided with metadata identifying for the data fields the data classes to which the respective data fields are assigned.

16 Claims, 7 Drawing Sheets

(56) References Cited

U.S. PATENT DOCUMENTS

| | | |
|---|---|---|
| 10,311,092 B2 | 6/2019 | Ganjam et al. |
| 2002/0082953 A1* | 6/2002 | Batham .............. G06Q 30/0625 |
| | | 707/E17.116 |
| 2004/0181526 A1* | 9/2004 | Burdick ................ G06F 16/285 |
| 2008/0154820 A1* | 6/2008 | Kirshenbaum ........ G06N 3/126 |
| | | 706/20 |
| 2011/0119208 A1* | 5/2011 | Kirshenbaum .......... G06N 5/02 |
| | | 706/54 |
| 2013/0054552 A1* | 2/2013 | Hawkins ................ G06N 20/00 |
| | | 707/706 |
| 2014/0161354 A1* | 6/2014 | Curcio ................... G06K 9/629 |
| | | 382/190 |
| 2016/0019197 A1* | 1/2016 | Iasi ....................... G06F 40/174 |
| | | 715/224 |
| 2017/0075974 A1* | 3/2017 | Shetty .................... G06N 20/00 |
| 2017/0235735 A1* | 8/2017 | Ignatyev ................ G06Q 10/00 |
| | | 706/12 |
| 2018/0088753 A1* | 3/2018 | Viégas .................. G06F 40/177 |
| 2019/0138509 A1 | 5/2019 | von Rickenbach et al. |

* cited by examiner

DATA CLASSIFICATION

BACKGROUND

The present disclosure relates to electronic data processing and, more specifically, to classification of data fields of a dataset.

The amount of data to be handled in modern information society is constantly increasing, driven by progress in the field of digital information and communication technologies, in particular by increasing networking. A central challenge for enabling an efficient processing of large amounts of data is a suitable data classification.

SUMMARY

Various embodiments provide a method for classifying data fields of a dataset as well as a computer program product and a computer system for executing the method as described by the subject matter of the independent claims. Advantageous embodiments are described in the dependent claims. Embodiments of the present invention can be freely combined with each other if they are not mutually exclusive.

One aspect disclosed herein relates to a method for classifying data fields of a dataset. The method may comprise providing a classifier configured for determining confidence values for a plurality of data classes independently from one another for the data fields. The confidence values identify a level of confidence that the respective data field belongs to the respective data class. The data class for which the confidence value exceeds a predefined threshold is identified as a data class candidate for the respective data field for which the respective confidence value is determined. The method may further comprise applying the classifier to the data fields of the dataset. First data fields of the dataset are determined for which a single data class candidate is identifiable. The first data fields are classified. The classifying of the first data fields comprises assigning the first data fields to the single data class identified as the data class candidate for the respective first data field. Second data fields are determined for which a plurality of data class candidates being identifiable. Using previous user-selected data class assignments, a probability is determined for the data class candidates identified for the second data fields that the respective data class candidate is a data class to which the respective second data field is to be assigned. The second data fields are classified using the probabilities determined for the data class candidates to select for the second data fields a data class from the data class candidates for the respective second data field to which the respective second data field is assigned. The dataset is provided with metadata identifying for the classified data fields of the dataset the data classes to which the respective classified data fields are assigned.

A further aspect disclosed herein relates to a computer program product comprising a non-volatile computer-readable storage medium having machine-executable program instructions embodied therewith for classifying data fields of a dataset. Execution of the program instructions by a processor of a computer may cause the processor to control the computer system to provide a classifier configured for determining confidence values for a plurality of data classes independently from one another for the data fields. The confidence value identifies a level of confidence that the respective data field belongs to the respective data class. The data class for which the confidence value exceeds a predefined threshold is identified as a data class candidate for the respective data field for which the respective confidence value is determined. Execution of the program instructions further causes the processor to control the computer system to apply the classifier to the data fields of the dataset. First data fields of the dataset are determined for which a single data class candidate is identifiable. The first data fields are classified. The classifying of the first data fields comprises assigning the first data fields to the single data class identified as the data class candidate for the respective first data field. Second data fields are determined for which a plurality of data class candidates being identifiable. Using previous user-selected data class assignments, a probability is determined for the data class candidates identified for the second data fields that the respective data class candidate is a data class to which the respective second data field is to be assigned. The second data fields are classified using the probabilities determined for the data class candidates to select for the second data fields a data class from the data class candidates for the respective second data field to which the respective second data field is assigned. The dataset is provided with metadata identifying for the classified data fields of the dataset the data classes to which the respective classified data fields are assigned.

A further aspect disclosed herein relates to a computer system for classifying data fields of a dataset. The computer system comprises a processor and a memory storing machine-executable program instructions. Execution of the program instructions by the processor causes the processor to control the computer system to provide a classifier configured for determining confidence values for a plurality of data classes independently from one another for the data fields. The confidence value identifies a level of confidence that the respective data field belongs to the respective data class. The data class for which the confidence value exceeds a predefined threshold is identified as a data class candidate for the respective data field for which the respective confidence value is determined. Execution of the program instructions further causes the processor to control the computer system to apply the classifier to the data fields of the dataset. First data fields of the dataset are determined for which a single data class candidate is identifiable. The first data fields are classified. The classifying of the first data fields comprises assigning the first data fields to the single data class identified as the data class candidate for the respective first data field. Second data fields are determined for which a plurality of data class candidates being identifiable. Using previous user-selected data class assignments, a probability is determined for the data class candidates identified for the second data fields that the respective data class candidate is a data class to which the respective second data field is to be assigned. The second data fields are classified using the probabilities determined for the data class candidates to select for the second data fields a data class from the data class candidates for the respective second data field to which the respective second data field is assigned. The dataset is provided with metadata identifying for the classified data fields of the dataset the data classes to which the respective classified data fields are assigned.

BRIEF DESCRIPTION OF THE DRAWINGS

In the following, embodiments of the invention are explained in greater detail, by way of example only, making reference to the drawings in which.

DETAILED DESCRIPTION

Figure 1:
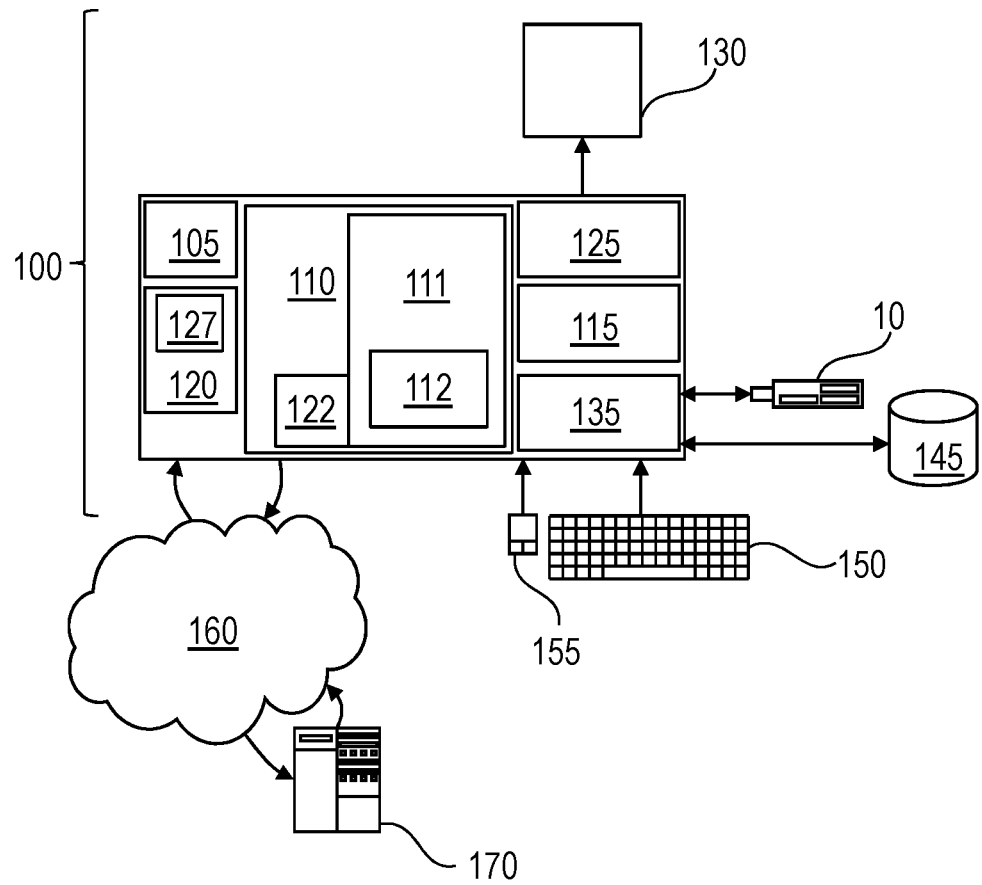
FIG. 1 depicts a schematic diagram illustrating an example computer system according to an embodiment.

The descriptions of the various embodiments of the present disclosure are being presented for purposes of illustration, and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of providing an efficient and effective approach for handling ambiguities regarding the classification of data fields, in particular, ambiguities that arise regarding a classification of individual data fields due to a plurality of data class candidates which all may be valid classification options for the respective data field with a sufficient level of confidence, i.e., a confidence value exceeding a predefined threshold. Such ambiguities may be resolved using previous user-selected data class assignments. For example, such previous user-selected data class assignments may be evaluated in order to identify probabilities for each of the data class candidates that the respective data class candidate is a data class to which the respective data field is to be assigned. The probabilities may, for example, be estimated using classification patterns identifiable for the previous user-selected data class assignments, taking into account class assignments of adjacent data field and/or taking into account metadata assigned to the data fields.

The dataset may comprise structured data in some embodiments. The data may be structured using data fields comprising one or more data values of a common type of data. A data field may be defined by an assignment of a common data field identifier ("data field ID") to the one or more data values. The data field ID may identify a logical and/or structural position within the dataset. The data field ID may be provided in the form of a common reference value, e.g., an alphanumerical value. Data fields may, e.g., be implemented in form of columns of a data table. Embodiments may provide data classification for structured data. The dataset may comprise a plurality of data records, each comprising a plurality of data values of different data fields. The data record may be assigned to an entity with the data values or the different data fields identifying different attributes assigned to the respective entity. The dataset may be provided in form of a database managed by a database management system, i.e., a system enabling a user to define, create, maintain, and control access to the database. The database management system may implement a data model according to which the data comprised by the database is organized. Thus, the data model may define and implement a structure for the data of the database.

Datasets may comprise various types of data, like sensor data or process data. A dataset may, e.g., comprise data from business processes and tasks. In case of enterprise related data, the entire lifecycle of the respective data elements may be referred to as Enterprise Information Lifecycle Management ("EILM"). EILM generally refers to the practice of applying policies based on classification of data for effectively managing information. A basic tenet concerning EILM is to identify and classify data elements based on a business criticality of the respective data and the nature of the business. Data management policies may concern creation, distribution, consumption, disposition, and/or destruction of the data depending on their classification. In general, a classification of data may be important to identify data that is relevant for a particular purpose, e.g., for security, like sensitive data requiring an encryption; for data required for assigning and managing access rights; for sensor data being indicative of an operational state of a device, like a production or processing facility; etc.

Data classification may, e.g., be used for determining which types of data are available, if the data is protected with the right control measures, e.g., read/write rights, or if a control meets predefined compliance requirements for the respective type of data. Data classification may have the beneficial effect of supporting data compliance and risk management, of optimizing data encryption strategies, because not all types of data may need to be encrypted. Thus, data to be encrypted may be selected based on the classification such that only sensitive types of data are encrypted, reducing the required effort for encrypting and/or decrypting as well as the handling of the data. Data classification may further have the beneficial effect of providing a better control of disaster recovery and data management continuity needs, of enabling an enhanced metadata management as a result of the classification, and of supporting appropriate data security control and access based on a criticality of the data depending on the data classes. A proper data classification may, for example, protect enterprises from compliance issues and may play an important role in EILM.

For a given dataset, a huge number of possible data classes may exist, e.g., hundreds of data classes or even more. During a data classification process, a few data classes may be identified as data class candidates for a data field of the dataset, like, e.g., a column, based on confidence values determined for each of the possible data classes. Thus, an ambiguity may arise regarding which of the data class candidates is to be selected as the correct and/or most suitable data class for the respective data field. Embodiments may have the beneficial effect of avoiding a need for an intervention by a domain expert for selecting one data class from the competing data class candidates. Furthermore, a continuous and stringent classification may be ensured.

For determining confidence values, the classifier may be configured for testing data values, metadata, and/or properties of each data field against reference features associated to an individual data class of the plurality of data classes taken into account by the classifier. The reference features may comprise a rule or heuristic defining how to decide if tested data values, metadata, and/or properties of a data field value match predefined classification criteria for a classification of the respective data value as a member of the respective data class. Examples for such reference features and/or rules or heuristics may comprise regular expressions, list of reference values, or other rules returning a quantitative confidence level that a given data field matches a given data class. For example, a confidence value may correspond to the percentage of data values of a given data field matching reference values of a given list of reference values or to an average degree of similarity of data formats of the data values of the given data field with a reference data format. For determining the confidence values, each data field may be tested independently from each other without taking into consideration the context of the data field or the content of other data fields of the same dataset. The result of the determination of confidence values may be a list of data classes that are likely to match the data contained in each tested data field and a confidence level that the classification is a good representation of the respective data field. For example, a list of one or more suitable data class candidates with confidence values exceeding a predefined threshold may be provided for each data field of the dataset. Based on the confidence values for the individual data classes, it may be determined which data class is best represented by the data field. The respective data class, for which a largest confidence value is determined, may automatically be selected and assigned to the data field.

Embodiments may have the beneficial effect that ambiguities in case of a plurality of suitable data class candidates for a data field may be efficiently and effectively resolved. The determining of the confidence values may, e.g., be based on a comparison with lists of reference values. Intelligence or awareness of a context of the data comprised by the data fields may be taken into account for the determining of the probabilities, and may thus help to achieve a better classification avoiding ambiguities.

A lack of intelligence of individual reference features and/or a potential high number of data classes may lead to ambiguities regarding the data classes, i.e., for a single data field, a plurality of data class candidates may be determined. Thus, multiple data classes of completely different domains may have the same confidence to describe the domain of the data field. Embodiments may have the beneficial effect of avoiding a random selection of a data class from the data class candidates as well as avoiding a requirement for a user to make a choice. Random selections may have the risk of leading to wrong classifications, which may impact on all further actions derived based on false classification. Requiring additional user input may complicate and/or slow down the data processing. Furthermore, the quality of the user input and thus the correctness of the classification may strongly depend on the expertise of the user providing the input.

For example, the following data classes may be assumed: "Gender" defined by a reference list of values {M, F, . . . }, "Product Category" defined by a reference list of values {B, C, E, F, M, N, P}, "Credit Card Expiration Date" defined as regular expression (regex) detecting dates, "Birth Date" defined as a regex detecting dates, "City" defined by a reference list of values comprising among other reference values {"Washington", "Denver", "Boston", "New-York", . . . }, and "Last Name" defined by a reference list of values comprising among other reference values {"Smith", "Washington", "Baker", "Boston", "Miller", "Boston", "Schumacher", . . . }.

The aforementioned example classes may be used to classify data fields of a dataset, e.g., columns of the following data table:

| 1 | 2 | 3 | 4 | 5 | 6 |
|---|---|---|---|---|---|
| Mary | Washington | F | Apr. 5, 1983 | 10021234 | November 2021 |
| Marc | Boston | M | Jun. 3, 1976 | 32314245 | October 2020 |
| Tom | Denver | M | Mar. 5, 1972 | 12344321 | May 2019 |

The first column (first data field) may comprise first names, the second column (second data field) may comprise last names, the third column (third data field) may comprise gender IDs, the fourth column (fourth data field) may comprise birth dates, the fifth column (fifth data field) may comprise credit card numbers, and the sixth column (sixth data field) may comprise credit card expiration dates.

Using the aforementioned example data classes, the second column may be assigned with a confidence value indicating 100% confidence that the respective column belongs to the data class "Last Name" as well as confidence value indicating 100% confidence that the respective column belongs to the data class "City". The third column may be assigned with a confidence value indicating 100% confidence that the respective column belongs to the data class "Gender" as well as confidence value indicating 100% confidence that the respective column belongs to the data class "Product Category". The fourth and the sixth column may both be assigned with confidence values indicating 100% confidence that the respective columns comprise "Birth Dates" as well as that that the respective columns comprise "Credit Card Expiration Dates."

According to embodiments, the classification process need not stop with the determining of the confidence values and the identification of the data class candidates, but rather may comprise another analysis operation with an inspection of the data class candidates and detecting ambiguities in form of a plurality of data class candidates determined for single data fields of the dataset, e.g., multiple non-related classification candidates are found for the same column of a dataset in form of a data table. Probabilities may be determined providing measures which quantify the likelihood that the data class candidates represent a data class to which the data field is to be assigned. The probabilities may be used for classifying the data fields with ambiguities regarding the data class candidates. For example, a data class candidate may be selected from the plurality of data class candidates based on the probabilities determined for the individual data class candidates. According to an embodiment, the data class candidate for which the largest probability is calculated may be selected. According to alternative embodiments, the probabilities are used for modifying the confidence values. For example, confidence values of data class candidates with larger probabilities may be increased, while confidence values of data class candidates with smaller probabilities may be decreased. For example, the confidence value of data class candidate with the larger probability may be increased, while confidence values of the remaining data class candidates with smaller probabilities may be kept constant or may be decreased. The probabilities may take into account the context of the data comprised by the data fields and/or properties of adjacent data fields. The decision of increasing or decreasing the confidence value of a data class candidate for a particular data field may be taken based on an assessment which data class candidate is more probable to represent a correct data class in view of the context of the respective data field. This assessment may comprise reviewing results derived by the classifier for other data fields of the dataset and searching, e.g., using a machine learning approach, which combination of classes is more likely to be found together. This assessment of which combinations are more likely may be based on a past history of user-selected data class assignments, logical data models and/or technical/business glossary. For example, metadata of the data fields may be analyzed and matched to the domains of the data class candidates.

According to embodiments, the data fields of the dataset may be organized in form of a data table using a row-oriented data model, e.g., a relational data model, comprising data fields in form of columns.

According to embodiments, the data fields of the dataset may be organized in form of a data table using a column-oriented data model comprising data fields in form of rows.

According to embodiments, the dataset may be provided in form of a structured document defining a set of entities with the data fields being provided in form of attributes assigned to the entities. The dataset may, e.g., be a structured document, formatted in JavaScript Object Notation (JSON) or Extensible Markup Language (XML), containing a set of entities. The data fields to be classified in that case may be properties of the entities, i.e., attributes assigned to the entities. An example structured document may, e.g., comprise:

---

"<Person firstName="John" LastName="Doe">
  <Address street="Main Street" houseNumber="5" City="Boston"/>
</Person>
<Person firstName="Emily" LastName="Miller">
  <Address street="5th Avenue" houseNumber="123" City="New-York"/>
</Person>"

---

The data fields that may be classified in this case are the attributes "Person.firstName", "Person.LastName", "Address.street", "Address.houseNumber", and "Address.City" assigned to the entities, which are persons. The data values of the same data field are assigned with the same data field ID, like "Person.firstName", "Person.LastName", "Address.street", "Address.houseNumber", and "Address.City.

According to embodiments, the determining of the probabilities comprises providing a machine learning model for the determining of the probabilities. The second data fields and identifiers of the data class candidates of the plurality of data class candidates for each of the second data fields may be provided as input data to the machine learning model. In response to the providing of the input data, the probability for each of the data class candidates that the respective data class candidate is a data class to which the respective second data field is to be assigned may be received from the machine learning model as output data.

Embodiments may have the beneficial effect of providing a machine learning model enabling an efficient determining of the probabilities for the data class candidates to be assigned to the second data fields. The learning model may be trained using training datasets comprising previous user-selected data class assignments for other datasets. The machine learning model may learn estimation strategies for efficiently and effectively estimating probabilities for data class candidates based on an analysis, e.g., a statistical analysis, of the previous user-selected data class assignments.

The term machine learning generally refers to a computer algorithm used to extract useful information from training datasets by building probabilistic models (referred to as machine learning models) in an automated way. The machine learning may be performed using one or more learning algorithms such as linear regression, K-means, classification algorithm, reinforcement algorithm etc. A model may for example be an equation or set of rules that makes it possible to predict an unmeasured value from other, known values or to determine a classification of an unclassified value.

According to embodiments, the input data further comprises the confidence values determined for the data class candidates which exceed the predefined threshold.

According to embodiments, the providing of the machine learning model comprises generating the machine learning model. The generating of the machine learning model comprises providing training datasets. Each training dataset may comprise one or more training second data fields and previous user-selected data class assignments for the one or more training second data fields. Each training second data field may be assigned with a plurality of data class candidates. The generating of the machine learning model further comprises executing a learning algorithm on the training datasets for generating the machine learning model.

Embodiments may have the beneficial effect that the generation of the machine learning model comprises a training of the machine learning model using a learning algorithm which is applied to training datasets. The training datasets may comprise user-selected data class assignments for training second data fields, i.e., for data fields of the training datasets with ambiguities regarding their classification. Based on the ambiguities in form of the plurality of data class candidates for each of the training second data fields on the one hand and the actual previous user-selected data class assignments for the respective training second data fields on the other hand, an effective estimation and/or decision strategy for the machine learning model may be derived, enabling the machine learning model to decide which data class candidate of a plurality of data class candidates to select.

According to embodiments, the training second data fields further are assigned with confidence values determined for the data class candidates which exceed the predefined threshold.

According to embodiments, one or more of the training datasets comprise one or more training first data fields and previous user-selected data class assignments for the one or more training first data fields. Each training first data field may be assigned with a single data class candidate. Embodiments may have the beneficial effect of taking into account for the training of machine learning model the data class assignments of training first data field as well, i.e., of data fields without ambiguities regarding data class candidates.

The generation of the machine learning model may, for example, be based on a supervised learning method using past classifications in form of the previous user-selected data class assignments. A training phase may be performed one time or repeatedly, e.g., at regular intervals independently from the data classification process. The training process may comprise scanning all available past classification results and determine clusters, i.e., groups, of data classes which have frequently returned a confidence above the predefined threshold for the same data field, like, e.g., a column of a data table. This process may map each data class to a cluster of data classes which are likely to occur together as data class candidates for the same data field. If a data class never has occurred together with any other data class as data class candidates for the same data field before, the respective data class may be mapped as a singleton made of itself. Different training datasets and classification models may be built for each cluster of data classes determined before. For each confirmed data classification from the past history, it may be determined to which of the aforementioned cluster of data classes the data class of the confirmed data classification belongs to. A data classification may be considered a confirmed classification if the classification has been reviewed by a user or has been set manually or if the classification has been set automatically with only a single data class candidate found for the same data field. If the group is a singleton, i.e., of size=1, the method may continue with the next confirmed classification. If the cluster is of size>1, clusters of data classes assigned to adjacent data fields within a range of interest around the data field under consideration may be determined. For example, the determined clusters for N adjacent data fields in a first direction from the data field under consideration, e.g., the next N columns located on the left, as well as for M adjacent data fields in a second direction from the data field under consideration may be identified, e.g., the next M columns located on the right. This approach may result in a tuple comprising clusters of data classes assigned to N+M+1 adjacent data fields {class(pos−1), class(pos−2), . . . class (pos−N), class(pos+1), class(pos+2), . . . class(pos+M), confirmed_class(pos)}, where "pos" is the index of the data field with the confirmed classification and class(i) identifies a data class cluster ID for the data field at index i as determined before, and confirmed_class(pos) identifying the single data class actually assigned to the data field at index "pos" due to a user selection. The resulting tuple is added to the training dataset associated with the data class cluster to which the confirmed data class belongs. At the end of the training set collection process, each cluster of size>1 may be associated with a list of tuples as computed in the previous operations. For each cluster, the machine learning model may be trained to predict the class (confirmed_class(pos)), based on the cluster IDs of the clusters determined for the adjacent data fields {class(pos−1), class(pos−2), . . . class (pos−N), class(pos+1), class(pos+2), . . . class(pos+M)}. In other words, the tuples of cluster IDs {class(pos−1), class (pos−2), . . . class(pos−N), class(pos+1), class(pos+2), . . . class(pos+M)} without the confirmed data classes (confirmed_class(pos)) may be provided as input for the training of the machine learning model and the confirmed data classes (confirmed_class(pos)) assigned to the individual tuples of cluster IDs may be provided as a designated output for the training of the machine learning model. At the end of the training, the machine learning model may be trained to predict for each of the tuples of cluster IDs the correct confirmed data classes (confirmed_class(pos)). According to embodiments the number of adjacent data fields taken into account are varied from 0 to N and from 0 to M, respectively, in order to cover the case that less than N or M adjacent data fields are comprised by the dataset.

Once the training phase is finished, the machine learning model may comprise a predictive classification model for each cluster of data classes enabling the machine learning model to predict for each cluster of data classes a data class which is most likely to be selected by the user based on the data class candidates determined for other data fields of the dataset.

For example, if for a data field more than one data class candidate is determined, i.e., there are more than one data class with a confidence value exceeding the predefined threshold, a cluster ID of the data class candidates of the respective fields may be determined. Based on the cluster ID determined, the machine learning model retrieves a classification model associated with the respective cluster from the set of trained classification models. Cluster IDs of clusters of data class candidates of adjacent data fields are determined, e.g., for N data fields on the left side and M data fields on the right side of the data field to classify. This combination of Cluster IDs determined for the adjacent data fields is provided as input to the retrieved classification model and a predicted data class is received in response. This may correspond to determining a probability of 100% for the predicted data class. The confidence value of the predicted data class may be increased, while the confidence values of all the other data class candidates may be decreased. Alternatively, probabilities are received for more than one data class candidate of the data field to be classified. The factor by which the confidence values of the data class candidates are increased and/or decreased may depend on the value of the probabilities. According to embodiments, the factor by which the confidence values of the data class candidates are modified may be constant or a function of the probability returned by the classification model, i.e., the level of confidence of the prediction.

According to embodiments, the learning algorithm may be configured for determining clusters of data classes assigned as data class candidates for the same training data fields of the training datasets. The learning algorithm may be further configured for determining probabilities for each of the data class candidates assigned to the training second data fields that the respective data class candidate is a data class to which the respective training second data field is assigned. The learning algorithm may take into account the clusters of data classes assigned as data class candidates to adjacent training data fields within a predefined range of interest around the respective training second data field.

Embodiments may have the beneficial effect of taking into account clusters of data class candidates, i.e., combinations of possible data classes, not only for the individual data fields to be classified, but also adjacent data fields within a predefined range of interest.

According to embodiments, the range of interest extends symmetrically around the respective training second data field. According to embodiments, the range of interest extends asymmetrically around the respective training second data field.

According to embodiments, the learning algorithm may be configured for determining for each training dataset a pattern of data classes assigned to the data fields comprised by the respective training dataset. The learning algorithm is further configured for determining, using a sequential pattern algorithm, sequential pattern rules indicating which data classes are to be found together in the same dataset.

Embodiments may have the beneficial effect of implementing a pattern recognition in the machine learning model, enabling the same to resolve ambiguities based on pattern recognition schemes.

According to embodiments, the sequential pattern algorithm is one of the following association rule algorithms: apriori algorithm, eclat algorithm, and FP-growth algorithm. Embodiments may have the beneficial effect of implementing an efficient pattern recognition.

Apriori algorithms may implement a frequent itemset mining and association rule learning, e.g., over a transactional database. The algorithm may proceed by identifying the frequent individual items in the database and extending them to larger and larger itemsets as long as those itemsets appear sufficiently often in the database. The frequent itemsets determined by the apriori algorithm may be used to determine association rules identifying patterns in the database.

The eclat algorithm is a depth-first search algorithm based on set intersection which is suitable for both sequential as well as parallel execution with locality-enhancing properties. The Frequent Pattern (FP)-growth algorithm may provide an efficient and scalable method for mining a complete set of frequent patterns by pattern fragment growth, using an extended prefix-tree structure for storing compressed and crucial information about frequent patterns referred to as the frequent-pattern tree (FP-tree).

According to embodiments, the sequential pattern algorithm identifies data classes often appearing together. According to embodiments, a training process for a pattern recognition may comprise scanning all available past classification results which have been reviewed and confirmed by a user. An itemset, i.e., a set of data classes, may be built comprising some or all of the previously selected data classes of all data fields taken into account, e.g., {class1, class2, class3, class4}. An associations model, e.g., using an apriori algorithm, a sequential pattern algorithm, or a similar algorithm, to obtain rules like "when class2 and class3 are in the itemset, then class4 is in the itemset with a confidence of 90%". In other words, in 90% of the examples considered, class4 is in the itemset, if class2 and class3 are in the itemset. Using such an approach, the resulting machine learning model may comprise one single classification model. According to embodiments, the training dataset, i.e., the itemsets provided by the past classification results, may be enriched with logical data models or industry models that may indicate which class of data are to be expected in the same type of entity. Logical data models may define sets and/or sequences of data types expected to occur together for logical reasons. Industry models, also referred to as technical models, may define sets and/or sequences of data types expected to occur together in the same industrial and/or technical field.

According to embodiments, the classification using the machine learning model may comprise the following: if a data field of dataset has more than one data class candidate, all data class candidates of all adjacent or all other data fields of the respective dataset may be determined and an itemset may be built for each possible unique combination of data class candidates for the dataset. For example, if a dataset with three data fields comprises a data field col1 with two data class candidates {class1, class2}, a data field col2 with one data class candidate {class3}, and a data field col3 with two data class candidates {class4, class5}, the generated itemsets for this example dataset may be: {class1, class3, class4}, {class2, class3, class4}, {class1, class3, class5}, and {class2, class3, class5}. All itemsets may be provided as input to the machine learning model, and it is determined if one of the rules comprised by the trained machine learning model predicts a data class candidate of the data field for which the ambiguity regarding the data class candidates is to be resolved. If this is the case, the confidence value of the predicted data class value is increased, while the confidence values of the other data class candidates are decreased. This may correspond to a probability of 100% for the predicted data class candidate. In case a plurality of data class candidates are predicted with different probabilities, the confidence values of the individual data class candidates may be modified depending on the probability determined for the respective data class candidates.

According to embodiments, the generating of the machine learning model comprises providing one or more logical data models or industry models as a further input to the learning algorithm. An industry model, like a technical glossary or business glossary, defines combinations of items and thus data classes which are expected to be present in a certain field of industry or technology. A logical data model describes a logical combination of items and thus data classes are expected to occur in combination with each other.

According to embodiments, the determining of the probabilities comprises analyzing similarities between metadata assigned to the second data fields and metadata assigned to the data class candidates.

Embodiments may have the beneficial effect of taking into account similarities between metadata of the data class candidates and metadata of the second data fields for resolving ambiguities regarding a classification of the respective second data fields. For example, the higher the similarity between the metadata of a data class candidate and the metadata of a second data field, the higher the probability may be that the respective data class candidate is the right data class for the respective second data field, i.e., the respective second data field is to be classified as a member the data class identified by the data class candidate. Similarity between metadata may, e.g., be determined using a metric for quantifying distances between the metadata, like Hamming distance, Levenshtein distance, or Damerau-Levenshtein distance.

According to embodiments, a function is provided for measuring the similarity between metadata, like, e.g., class names and/or terms associated with the data classes with names of the data fields and/or terms associated with the data fields. The function may, e.g., be implemented by an edit distance function or a machine learning based function. If a data field with multiple data class candidates is detected, for example, the confidence values of a data class candidate having a class name with the largest similarity with a name of the data field to be classified may be increased, while the confidence values of the other data class candidates may be decreased. This may correspond to a probability of 100% for the data class candidate with the largest similarity. According to embodiments, the increasing and decreasing of the confidence values of the data class candidates may depend on the similarities determined for the individual data class candidates. The similarities may correspond to probabilities. A large similarity may result in an increase and/or a small similarity may result in a decrease.

According to embodiments, the determining of the probabilities may comprise calculating a plurality of preliminary probabilities for each of the data class candidates using different calculation methods. Embodiments may have the beneficial effect of taking into account not only results of a single method for calculating probabilities for the data class candidates, but also the results of a plurality of calculation methods different from each other. Basing any classification decision on more, e.g., independent, calculation methods may increase the reliability of the final classification results.

According to embodiments, all different calculation methods described herein may be executed. Each calculation method may return an individual decision on and/or probabilities of the data class candidates of a data field under consideration. The final decision may be computed as a function of all the different decisions, e.g., by averaging the decisions of all the different calculation methods into a consolidated score for each data class candidate or by choosing the data class returned by the majority of different methods.

According to embodiments, the determining of the probabilities may further comprise calculating an averaged probability of the plurality of preliminary probabilities for each of the data class candidates. Embodiments may have the beneficial effect of providing an efficient and effective method for taking into account of the different calculation methods by averaging the results of the respective calculation methods, i.e., the preliminary probabilities.

According to embodiments, the determining of the probabilities may further comprise determining for each of the second data fields the data class candidate with a largest preliminary probability for each of the different calculation method. For determining the probability for each of the second data fields, the data class candidate for which most of the different calculation methods determined the largest preliminary probability may be selected.

Embodiments may have the beneficial effect of basing any classification decision on a majority decision resulting from the plurality of calculation methods. For each of the second data fields, a plurality of data class candidates may be identified. With each calculation method, a preliminary probability may be calculated for each of the data class candidates of the respective plurality of data class candidates. Thus, with each calculation method, a plurality of preliminary probabilities for each data class candidates of the respective plurality of data class candidates may be provided. For each method, the data class candidate with the largest preliminary probability relative to the other preliminary probabilities calculated with the same calculation method may be selected. Thus, for each second data field, a plurality of preliminary probabilities may be selected, which comprises a (largest) preliminary probability for each calculation method. Each of the selected (largest) preliminary probability may be assigned to one of the data class candidates. Some of the selected (largest) preliminary probabilities may be assigned to the same data class candidates, and some may be assigned to different data class candidates. For each second data field, the data class candidate to which most of the selected (largest) preliminary probabilities are assigned may be selected as the data class of the respective second data field. Thus, the selection for each second data field may be based on a majority decision made by a majority of the calculation methods.

According to embodiments, the method further comprises executing a search query on the dataset with the metadata identifying data classes using a data class identifier as a search parameter of the search query. Furthermore, a search result for the search query is provided. Embodiments may have the beneficial effect that the metadata identifying the results of the classification may be used for improving search queries executed on the classified dataset. The dataset may be implemented in the form of a database.

According to embodiments, the method further comprises importing the dataset into a target database. The target database may be organized using a target data model defining a class-based arrangement of data fields. The importing may comprise rearranging the data fields of the dataset according to the target data model using the metadata identifying the data classes to which the data fields of the dataset are assigned and adding the rearranged dataset to the target database in accordance with the target data model.

Embodiments may have the beneficial effect of enabling and/or improving an import of the dataset into a target database. For example, based on the classification, a decision may be made if data of the dataset has to be encrypted before importing the same. This may be the case if it is required by the target data model to encrypt data values of certain sensitive data classes. For example, based on the classification, a decision may be made if data of the dataset is to be excluded from the import, e.g., due to security reasons. The dataset may, e.g., result from a parsing operation. However, such a dataset resulting from a parsing operation may not comprise any classification of the data fields comprised by the respective dataset. Thus, in order to be able to import the respective dataset into the target database without spoiling the data structure of the target database and maintaining any optimization, e.g., search optimization, implemented by the data model used for organizing the target database, the dataset may have to be rearranged in accordance with the target data model using the classification of the data fields.

A classification of the data fields may furthermore be used for a selective import and/or export of data of a specific data class from, or to, respectively, the dataset. Furthermore, a classification of the data fields may be required in case of a data recovery. For example, metadata identifying classifications of data fields of the dataset may be corrupted and, in order to recover the information content of the dataset as far as possible, a reclassification of the data fields may be required.

According to embodiments, the computer program product further comprises machine-executable program instructions configured to implement any of the embodiments of the method for providing one or more random sample documents from a corpus of documents described herein.

According to embodiments, the computer system further is configured to execute any of the embodiments of the method for providing one or more random sample documents from a corpus of documents described herein.

FIG. 1 shows an example computer system 100 configured for classifying data fields of a dataset. The dataset may be stored on the computer system 100 or a storage media accessible by the computer system, e.g., a local removable storage device or a remote storage device. The computer system 100 described herein may be any type of computerized system comprising a plurality of plurality of processor chips, a plurality of memory buffer chips and a memory. The computer system 100 may for example be implemented in form of a general-purpose digital computer, such as a personal computer, a workstation, or a minicomputer.

In some embodiments, in terms of hardware architecture, as shown in FIG. 1, the computer system 100 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer system 100, a semiconductor-based microprocessor (in the form of a microchip or chip set), a macroprocessor, or generally any device for executing software instructions.

The memory 110 can include any one or combination of volatile memory modules (e.g., random access memory (RAM, such as DRAM, SRAM, SDRAM, etc.)) and nonvolatile memory modules (e.g., ROM, erasable programmable read only memory (EPROM), electronically erasable programmable read only memory (EEPROM), or programmable read only memory (PROM)). Note that the memory 110 can have a distributed architecture, where additional modules are situated remote from one another, but can be accessed by the processor 105.

The software in memory 110 may include one or more separate programs, each of which may comprise an ordered listing of executable instructions for implementing logical functions, notably functions involved in embodiments of this invention. For example, the executable instructions may be configured to perform a classification of data fields of a dataset. The software may comprise a machine learning model trained for classifying data fields. The executable instructions may further be configured to generate the machine learning model and train the same. The software may, e.g., comprise a learning algorithm for generating the machine learning model. The software may in addition or alternatively comprise a sequential pattern algorithm. The sequential pattern algorithm may, e.g., be one of the following association rule algorithms: apriori algorithm, eclat algorithm, and FP-growth algorithm. The software in memory 110 may further include a suitable operating system (OS) 111. The OS 111 may control the execution of other computer programs, such as possibly software 112.

If the computer system 100 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS may be stored in ROM so that the BIOS can be executed when the computer system 100 is activated.

When the computer system 100 is in operation, the processor 105 is configured for executing software 112 stored within the memory 110, to communicate data to and from the memory 110, and to generally control operations of the computer system 100 pursuant to the software. The methods described herein and the OS 111, in whole or in part, but typically the latter, are read by the processor 105, possibly buffered within the processor 105, and then executed.

Software 112 may further be provided stored on any computer readable medium, such as storage 120, for use by or in connection with any computer related system or method. The storage 120 may comprise a disk storage such as HDD storage.

In some embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 may be any generalized cryptographic card or smart card known in the art. The computer system 100 can further include a display controller 125 coupled to a display 130. In example embodiments, the computer system 100 can further include a network interface for coupling to a network 160, like an intranet or the Internet. The network can be an IP-based network for communication between the computer system 100 and any external server, like server 170, other client and the like via a broadband connection. The network 160 transmits and receives data between the computer system 100 and server 170. In example embodiments, network 160 may be a managed IP network administered by a service provider. The network 160 may be implemented in a wireless fashion, e.g., using wireless protocols and technologies, such as Wi-Fi, WiMAX, etc. The network 160 may also be a packet-switched network such as a local area network, wide area network, metropolitan area network, Internet network, or other similar type of network environment. The network may be a fixed wireless network, a wireless local area network (LAN), a wireless wide area network (WAN) a personal area network (PAN), a virtual private network (VPN), intranet or other suitable network system and includes equipment for receiving and transmitting signals.

Figure 2:
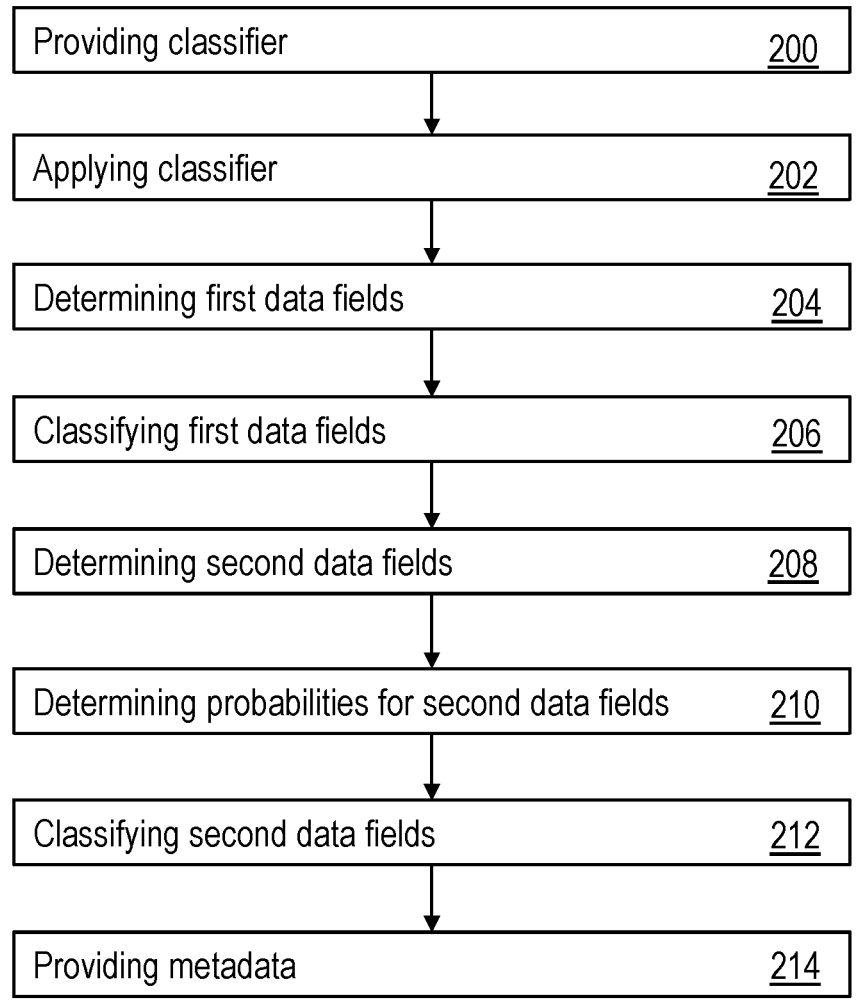
FIG. 2 depicts a schematic flow diagram of an example method for classifying data fields of a dataset according to an embodiment, FIGS. 3A and 3B (collectively FIG. 3) depict a schematic flow diagram of an example method for classifying data fields of a dataset according to an embodiment.

FIG. 2 shows a schematic flow diagram of an example method for classifying data fields of a dataset according to an embodiment. In operation 200, a classifier is provided for classifying data fields of a dataset. In operation 202, the classifier is applied to the data fields of the dataset. The classifier is configured for each of the data fields for determining confidence values for a plurality of data classes independently from one another. Each of the confidence value identifies a level of confidence for one of the data classes that the respective data field belongs to the respective data class. In case a confidence value exceeds a predefined threshold, the data class for which the confidence level is calculated is identified as a data class candidate for the respective data field. In operation 204, first data fields of the dataset are determined. The first data fields are data fields for which a single data class candidate is identifiable. In operation 206, the first data fields are classified, i.e., data fields of the dataset for which only a single data class candidate is identified based on the confidence values determined by the classifier. The classifying of the first data fields comprises assigning each of the first data fields to the single data class identified as the data class candidate for the respective first data field.

In operation 208, second data fields are determined. Second data fields are data fields of the dataset for which a plurality of data class candidates is identifiable. In operation 210, using previous user-selected data class assignments, a probability is determined for each of the data class candidates identified for each of the second data fields determined in operation 208. The probability is a measure quantifying the likelihood that the respective data class candidate is a data class to which the respective second data field is to be assigned. In operation 212, the second data fields determined in operation 208 are classified using the probabilities determined in operation 210. The probabilities are used to select for each of the second data fields a data class from the data class candidates. The data class may be selected based on modified confidence values modified using the probabilities. For example, the data class of the plurality of data class candidates for which the largest confidence value is determined may be selected. According to alternative embodiments, the data class may be selected based on probabilities. For example, the data class of the plurality of data class candidates for which the largest probability is determined may be selected. In operation 214, the dataset is provided with metadata identifying, for the classified data fields of the dataset, the data classes to which the respective classified data fields are assigned. The respective metadata may, e.g., be used for executing search queries on the dataset comprising data class identifiers as search parameters, for exporting or importing data fields of specific class from the dataset and to the dataset, respectively. The classification method described above may be used for classifying unclassified data fields or for recovering a classification of the data fields.

Figure 3A:
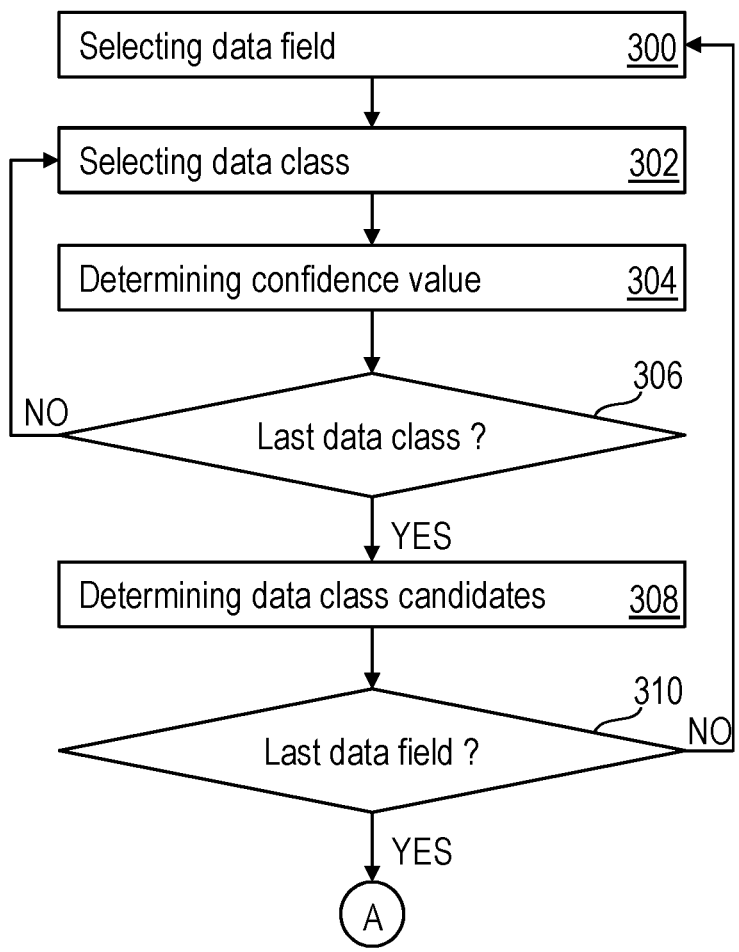
Figure 3B:
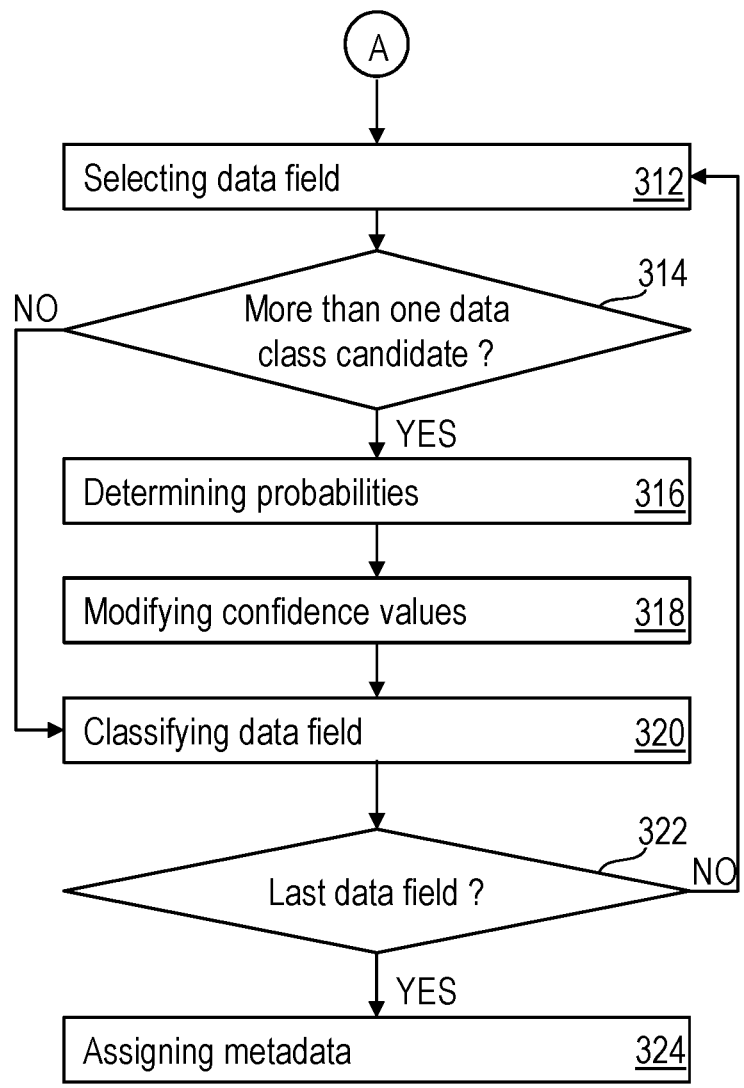

Combined FIGS. 3A and 3B shows a schematic flow diagram of an example method for classifying data fields of a dataset using a classifier according to an embodiment. The dataset may comprise a plurality of data fields. The classifier may be configured for determining confidence value for a plurality of data classes. In operation 300 of FIG. 3A, a data field may be selected. The data fields may, e.g., be processed in sequence, i.e., the data fields may be selected according to a sequential order in which they are comprised by the dataset. In operation 302, a data class is selected. The data classes may, e.g., be processed in sequence, i.e., the data classes may be selected according to a sequential order defined by the classifier. In operation, 304 a confidence value is determined. The confidence value identifies a level of confidence that the data field selected in operation 300 belongs to the data class selected in operation 302. In operation 306, the selected data class is checked to determine if it is the last of the data classes taken into account bay the classifier, i.e., whether all the data classes have been processed. If the selected data class is not the last data class, the method continues with operation 302. This, loop of operations 302 to 306 is repeated until all data classes of the classifier have been processed for the data field selected in operation 300. If the selected data class is the last data class, the method continues in operation 308. In operation 308, data class candidates are determined, i.e., it is determined for which of the data classes the confidence value exceeds a predefined threshold. In operation 310, it is checked if the data field for which the data class candidates are determined is the last data field of the dataset for which data class candidates had to be determined. In case all data fields of the dataset have been processed, i.e., data class candidates have been determined for the same, the method continues with operation 312 of FIG. 3B. If the data field for which the data class candidates are determined not the last data field of the dataset, i.e., as long as the dataset comprises data fields for which no attempts to determine data class candidates have been made, the method continues in operation 300 selecting the next data class. The operations 300 to 310 may be repeated, until data class candidates have been determined for all data fields of the dataset.

In operation 312 of FIG. 3B, a data field may be selected. After finishing the first loop comprising operations 300 to 310 of FIG. 3A, a second loop shown in FIG. 3B is started and the data fields are sequentially processed in order to classify them using the data class candidates determined in operation 308. In operation 314, it is checked if more than one data class candidates have been determined for the data field selected in operation 312, i.e., if more than one confidence value exceeds the predefined threshold. If only a single data class candidate is determined, the method continues in operation 320. In operation 320, the data field is classified by assigning the same to the data class of the single data class candidate. If more than one data class candidates are determined, the method continues in operation 316. In operation 316, probabilities are determined for each of the data class candidates. The probabilities provide measures quantifying the likelihood that the data class candidates are data classes to which the respective data field is to be assigned. In operation 318, the confidence values determined in operation 304 for the data class candidates are modified using the probabilities. For example, confidence values of data class candidates with a larger probability may be increased and/or confidence values of data class candidates with a smaller probability may be decreased. In operation 320, the data field is classified. The classifying may comprise assigning the respective data field to the data class of the data class candidate with the largest confidence value. In operation 322, it is check if the data field classified is the last unclassified data field of the dataset. In case all data fields of the dataset have been processed, i.e., classified, the classification ends in operation 324 and metadata is assigned to the dataset identifying for each of the classified data fields the data class to which the respective data field has been assigned. If the data field classified is not the last data field of the dataset, i.e., as long as the dataset comprises unclassified data fields for which no classification attempts have been made, the method continues in operation 312 selecting the next data class. The operations 312 to 322 may be repeated until all data fields of the dataset have been classified.

Figure 4:
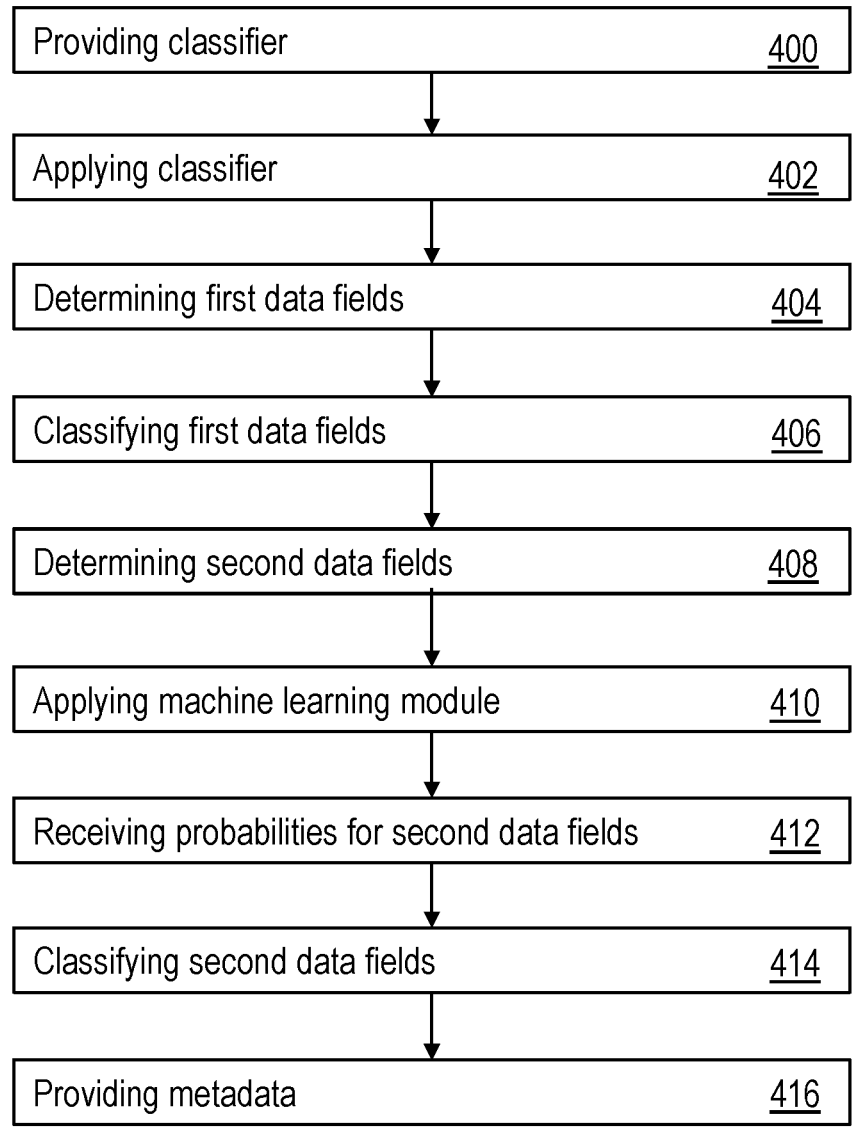
FIG. 4 depicts a schematic flow diagram of an example method for classifying data fields of a dataset according to an embodiment.

FIG. 4 shows a schematic flow diagram of an example method for classifying data fields of a dataset according to an embodiment. operations 400 to 408 of FIG. 4 correspond to operations 200 to 208 of FIG. 2. In operation 410, a machine learning model is applied for determining a probability for each of the data class candidates identified for each of the second data fields using previous user-selected data class assignments. The previous user-selected data class assignments may have been used for training the machine learning model. Applying the machine learning model may comprise providing the second data fields as well as identifiers of the data class candidates of the plurality of data class candidates for each of the second data fields as input data to the machine learning model. The identifiers may be provided in combination with the confidence values. According to alternative embodiments, the identifiers are provided without any confidence values. In operation 412, in response to the providing of the input data, the probability for each of the data class candidates is receiving from the machine learning model as output data. The probability provides a measure quantifying the likelihood that the respective data class candidate is a data class to which the respective second data field is to be assigned. Remaining operations 414 and 416 of FIG. 4 correspond to operations 212 and 214 of FIG. 2.

Figure 5:
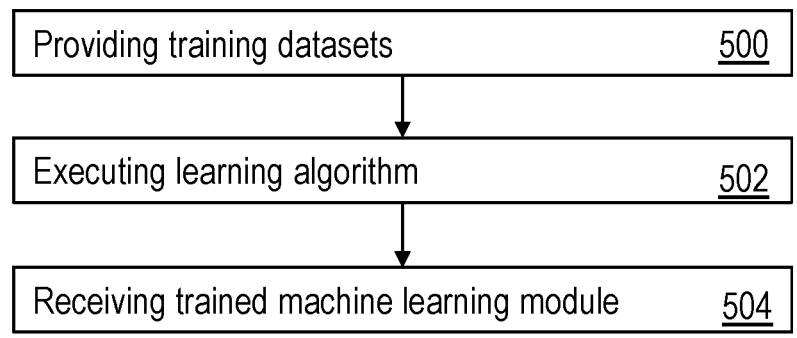
FIG. 5 depicts a schematic flow diagram of an example method for generating a machine learning model according to an embodiment.

FIG. 5 shows a schematic flow diagram of an example method for generating a machine learning model according to an embodiment. Such a machine learning model may, e.g., in method of FIG. 4. In operation 500, training datasets are provided. Each training dataset may comprise one or more training second data fields and previous user-selected data class assignments for the one or more training second data fields. Each training second data field is assigned with a plurality of data class candidates. According to embodiments, the training second data fields may further be assigned with confidence values determined for the data class candidates which exceed the predefined threshold. According to embodiments, one or more of the training datasets may further comprise one or more training first data fields and previous user-selected data class assignments for the one or more training first data fields. Each training first data field is assigned with a single data class candidate. In operation 502, a learning algorithm is executed on the training datasets for generating the machine learning model. In operation 504, the generated machine learning model trained using the training datasets is received.

Figure 6:
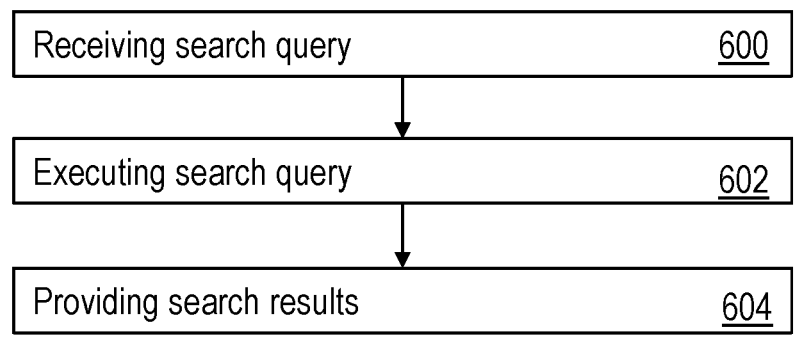
FIG. 6 depicts a schematic flow diagram of an example method for executing a search query on a classified dataset according to an embodiment.

FIG. 6 shows a schematic flow diagram of an example method for executing a search query on a classified dataset according to an embodiment. The classified dataset may, e.g., result from one of the methods of FIG. 2 to FIG. 3. In operation 600, a search query is received comprising one or more data class identifiers as search parameters. In operation 602, the search query is executed on the classified database using the one or more data class identifiers comprised by the search query as search parameters. In operation 604, search results are provided. The search results may comprise one or more data values comprised by datasets from data fields assigned to the data classes identified by the data class identifiers.

Figure 7:
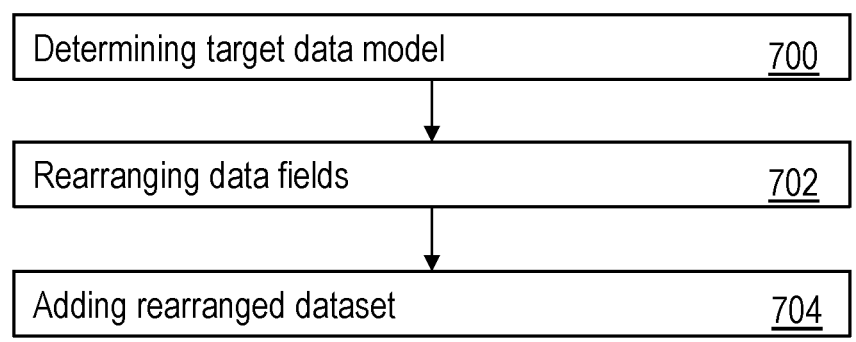
FIG. 7 depicts a schematic flow diagram of an example method for importing a classified dataset according to an embodiment.

FIG. 7 shows a schematic flow diagram of an example method for importing a classified dataset according to an embodiment. In operation 700, a target data model of a target database is determined. The target database may be organized using the target data model defining a class-based arrangement of data fields. In operation 702, the data fields of the dataset are rearranged according to the target data model using metadata identifying data classes to which the data fields of the dataset are assigned. In operation 704, the rearranged dataset is added to the target database in accordance with the target data model. The rearranged dataset may, e.g., be appended to the target database. Alternatively, data records comprised by the rearranged dataset may be inserted into the target database at target positions in accordance an order defined by the target data model, like, e.g., an alphabetic order or a numerical order.

One or more of the aforementioned embodiments may be combined as long as the combined embodiments are not mutually exclusive. Ordinal numbers, like e.g., "first", "second" and "third", are used herein to indicate different element assigned with the same name, but do not necessarily establish any order of the respective elements, unless otherwise indicated.

Aspects are described herein with reference to flowchart illustrations and/or block diagrams of methods, apparatus (systems), and computer program products according to embodiments of the invention. Each block of the flowchart illustrations and/or block diagrams, and combinations of blocks in the flowchart illustrations and/or block diagrams, can be implemented by computer readable program instructions.

The disclosure herein may apply to a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for automatically classifying data fields of a dataset, the method comprising:
   providing training datasets, each training dataset comprising one or more training first data fields and previous user-selected data class assignments for the one or more training first data fields, each training first data field being assigned with a plurality of data class candidates; and
   executing a machine learning algorithm on the training datasets for generating a machine learning model, wherein executing the machine learning algorithm comprises:
      retrieving, from a computer readable storage medium, the previous user-selected data class assignments for the one or more training first data fields
      calculating, using the machine learning model, clusters of data classes being assigned as data class candidates for the same training data fields of the training datasets;
      calculating, using the machine learning model, probabilities for each of the data class candidates assigned to the training first data fields that a respective data class candidate is a data class to which the respective training first data field is assigned taking into the clusters of data classes assigned as data class candidates to adjacent training data fields within a predefined range of interest around the respective training first data field; and
      comparing the calculated probabilities to the retrieved user-selected data class assignments;
   storing, in the computer readable storage medium, confidence values for a plurality of data classes, wherein the confidence values are determined by applying a classifier to data fields of a dataset, wherein the classifier is configured for determining the confidence values independently from one another for a plurality of data fields, wherein the confidence values identify a level of confidence that a respective data field belongs to a respective data class, and wherein the data class for which the confidence value exceeds a predefined threshold is identified as a data class candidate for the respective data field for which the respective confidence value is determined;
   calculating, by a processor, and storing, in the computer readable storage medium, first data fields for which the plurality of data class candidates are identifiable;
   calculating, by the machine learning model trained using previous user-selected data class assignments, and storing, in the computer readable storage medium, a probability for the data class candidates identified for the first data fields that the respective data class candidate is a data class to which a respective first data field is to be assigned;
   storing, in the computer readable storage medium, classifications for the stored first data fields, wherein the classifications are determined, by the processor, using the stored probabilities for the data class candidates to select for the stored first data fields a data class from the data class candidates for the respective first data field to which the respective first data field being assigned; and
   storing, in the computer readable storage medium, the dataset with metadata identifying for the classified data fields of the dataset the data classes to which the respective classified data fields are assigned;
   importing the classified dataset into a target database in the computer readable storage medium;
   organizing the target database using the target data model defining a class-based arrangement of data fields;
   rearranging data fields of the dataset according to the target data model using metadata identifying data classes to which the data fields of the dataset are assigned;
   adding the rearranged dataset to the target database in accordance with the target data model;
   executing a search query on the classified dataset with the metadata identifying data classes using a data class identifier as a search parameter of the search query; and
   providing a search result, for the search query, comprise one or more data values comprised by datasets from data fields assigned to the data classes identified by the data class identifiers.

2. The method of claim 1, wherein the data fields of the dataset are organized in a form of a data table using a row-oriented data model comprising data fields in form of columns.

3. The method of claim 1, wherein the dataset is provided in a form of a structured document defining a set of entities with the data fields being provided in form of attributes assigned to the entities.

4. The method of claim 1, wherein the determining of the probabilities comprises:
   providing the first data fields and identifiers of the data class candidates of the plurality of data class candidates for each of the first data fields as input data to the machine learning model; and in response to the providing of the input data, receiving from the machine learning model as output data, the probability for each of the data class candidates that the respective data class candidate is the data class to which the respective first data field is to be assigned.

5. The method of claim 4:
wherein one or more of the training datasets comprises one or more training second data fields and previous user-selected data class assignments for the one or more training second data fields, each training second data field being assigned with a single data class candidate; and
the method further comprising:
   determining second data fields of the dataset for which the single data class candidate being identifiable; and
   classifying the second data fields, the classifying of the second data fields comprising assigning each of the second data fields to the single data class identified as the data class candidate for the respective second data field.

6. The method of claim 5, wherein the range of interest extends symmetrically around the respective training first data field.

7. The method of claim 5, wherein the range of interest extends asymmetrically around the respective training first data field.

8. The method of claim 4, wherein the learning algorithm is configured for:
determining for each training dataset a pattern of data classes assigned to the data fields comprised by a respective training dataset; and
determining, using a sequential pattern algorithm, sequential pattern rules indicating which data classes to be found together in a same dataset.

9. The method of claim 8, the sequential pattern algorithm is selected from a group of association rule algorithms consisting of: an apriori algorithm, an eclat algorithm, and an FP-growth algorithm.

10. The method of claim 4, wherein the generating of the machine learning model comprises providing one or more logical data models or industry models as a further input to the learning algorithm.

11. The method of claim 1, wherein the determining of the probabilities comprises analyzing similarities between metadata assigned to the first data fields and metadata assigned to the data class candidates.

12. The method of claim 1, wherein the determining of the probabilities comprises calculating a plurality of preliminary probabilities for each of the data class candidates using different calculation methods.

13. The method of claim 12, wherein the determining of the probabilities further comprises calculating an averaged probability of the plurality of preliminary probabilities for each of the data class candidates.

14. The method of claim 12, wherein the determining of the probabilities further comprises:
determining for the first data fields the data class candidate with a largest preliminary probability for the different calculation method; and
selecting for determining the probability for each of the first data fields the data class candidate for which most of the different calculation methods determined the largest preliminary probability.

15. A computer program product comprising a non-transitory-computer-readable storage medium having machine-executable program instructions embodied therewith for automatically classifying data fields of a dataset, execution of the program instructions by a processor of a computer system causing the processor to control the computer system to:
receive training datasets, each training dataset comprising one or more training first data fields and previous user-selected data class assignments for the one or more training first data fields, each training first data field being assigned with a plurality of data class candidates; and
execute a machine learning algorithm on the training datasets to generate a trained machine learning model, wherein the learning algorithm is configured for:
   calculating, for each training dataset, clusters of data classes assigned to the data fields comprised by the retrieved training datasets; and
   calculating, using a sequential pattern algorithm of the machine learning algorithm, probabilities indicating which data classes to be found together in a same dataset;
   comparing the calculated probabilities to the retrieved user-selected data class assignments;
store confidence values for a plurality of data classes, wherein the confidence values are determined by applying a classifier to data fields of the dataset, wherein the classifier configured for determining the confidence values independently from one another for the data fields, the confidence value identifying a level of confidence that the respective data field belongs to the respective data class, the data class for which the confidence value exceeding a predefined threshold being identified as a data class candidate for the respective data field for which the respective confidence value is determined;
calculate first data fields of the dataset for which a single data class candidate being identifiable;
store a classification of the first data fields, wherein the classification of the first data fields comprises assigning the first data fields to the single data class identified as the data class candidate for the respective first data field;
calculate second data fields for which the plurality of data class candidates being identifiable;
calculate, by the trained machine learning model trained using previous user-selected data class assignments, a probability for the data class candidates identified for the second data fields that the respective data class candidate is a data class to which the respective second data field is to be assigned;
store a classification of the second data fields, wherein the classification is calculated, by a computer processor using the probabilities determined for the data class candidates by the trained machine learning model to select for the second data fields a data class from the data class candidates for the respective second data field to which the respective second data field being assigned; and
storing, in the computer readable storage medium, the dataset with metadata identifying for the classified data fields of the dataset the data classes to which the respective classified data fields are assigned;
import the classified dataset into a target database in the computer readable storage medium;
organize the target database using the target data model defining a class-based arrangement of data fields;
rearrange data fields of the dataset according to the target data model using metadata identifying data classes to which the data fields of the dataset are assigned;

add the rearranged dataset to the target database in accordance with the target data model;
execute a search query on the classified dataset with the metadata identifying data classes using a data class identifier as a search parameter of the search query; and
provide a search result, for the search query, comprise one or more data values comprised by datasets from data fields assigned to the data classes identified by the data class identifiers.

16. A computer system for automatically classifying data fields of a dataset, the computer system comprising:
a processor and a memory storing machine-executable program instructions, execution of the program instructions by the processor causing the processor to control a computer system to:
receive training datasets, each training dataset comprising one or more training first data fields and previous user-selected data class assignments for the one or more training first data fields, each training first data field being assigned with a plurality of data class candidates; and
execute a machine learning algorithm on the training datasets to generate a trained machine learning model, wherein executing the machine learning algorithm comprises:
calculating, for each training dataset, clusters of data classes assigned to the data fields comprised by the retrieved training datasets; and
calculating, using a sequential pattern algorithm of the machine learning algorithm, probabilities indicating which data classes to be found together in a same dataset;
comparing the calculated probabilities to the retrieved user-selected data class assignments;
store, in the memory, confidence values for a plurality of data classes, wherein the confidence values are determined by applying a classifier to data fields of the dataset, wherein the classifier configured for determining the confidence values independently from one another for the data fields, the confidence value identifying a level of confidence that the respective data field belongs to the respective data class, the data class for which the confidence value exceeding a predefined threshold being identified as a data class candidate for the respective data field for which the respective confidence value is determined;
calculate first data fields of the dataset for which a single data class candidate being identifiable;
store, in the memory, a classification of the first data fields, wherein the classification of the first data fields comprises assigning the first data fields to the single data class identified as the data class candidate for the respective first data field;
calculate second data fields for which a plurality of data class candidates being identifiable;
calculate, by the trained machine learning model trained using previous user-selected data class assignments, a probability for the data class candidates identified for the second data fields that the respective data class candidate is a data class to which the respective second data field is to be assigned;
store, in the memory, a classification of the second data fields, wherein the classification is calculated, by a computer processor using the probabilities determined for the data class candidates by the trained machine learning model to select for the second data fields a data class from the data class candidates for the respective second data field to which the respective second data field being assigned; and
store, in a computer readable storage medium communicatively coupled to the processor, the dataset with metadata identifying for the classified data fields of the dataset the data classes to which the respective classified data fields are assigned;
import the classified dataset into a target database in the computer readable storage medium;
organize the target database using the target data model defining a class-based arrangement of data fields;
rearrange data fields of the dataset according to the target data model using metadata identifying data classes to which the data fields of the dataset are assigned;
add the rearranged dataset to the target database in accordance with the target data model;
execute a search query on the classified dataset with the metadata identifying data classes using a data class identifier as a search parameter of the search query; and
provide a search result, for the search query, comprise one or more data values comprised by datasets from data fields assigned to the data classes identified by the data class identifiers.

* * * * *